US012082319B2

(12) United States Patent
Kanemitsu et al.

(10) Patent No.: US 12,082,319 B2
(45) Date of Patent: Sep. 3, 2024

(54) LED DRIVING DEVICE, LIGHTING DEVICE, AND VEHICLE-MOUNTED DISPLAY DEVICE

(71) Applicant: Rohm Co., Ltd., Kyoto (JP)

(72) Inventors: Ryosuke Kanemitsu, Kyoto (JP); Koji Katsura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 148 days.

(21) Appl. No.: 17/778,525

(22) PCT Filed: Sep. 29, 2020

(86) PCT No.: PCT/JP2020/037019

§ 371 (c)(1),
(2) Date: May 20, 2022

(87) PCT Pub. No.: WO2021/106360

PCT Pub. Date: Jun. 3, 2021

(65) Prior Publication Data

US 2023/0040250 A1 Feb. 9, 2023

(30) Foreign Application Priority Data

Nov. 27, 2019 (JP) ................................ 2019-214181

(51) Int. Cl.

| | |
|---|---|
| ***H05B 45/30*** | (2020.01) |
| ***H05B 45/10*** | (2020.01) |
| ***H05B 45/325*** | (2020.01) |
| ***H05B 45/345*** | (2020.01) |
| ***H05B 45/46*** | (2020.01) |

(52) U.S. Cl.
CPC .......... *H05B 45/345* (2020.01); *H05B 45/10* (2020.01); *H05B 45/325* (2020.01); *H05B 45/46* (2020.01)

(58) Field of Classification Search
CPC ...... H05B 45/10; H05B 45/30; H05B 45/325; H05B 45/345; H05B 45/46; H05B 47/10
See application file for complete search history.

(56) References Cited

U.S. PATENT DOCUMENTS

| | | | | |
|---|---|---|---|---|
| 2010/0148679 | A1* | 6/2010 | Chen ..................... | H05B 45/46 315/297 |
| 2012/0074845 | A1 | 3/2012 | Aoki et al. | |
| 2012/0133291 | A1 | 5/2012 | Kitagawa et al. | |
| 2013/0016310 | A1 | 1/2013 | Kanemitsu et al. | |

(Continued)

FOREIGN PATENT DOCUMENTS

| | | |
|---|---|---|
| JP | 2012-071712 | 4/2012 |
| JP | 2012-114316 | 6/2012 |

(Continued)

OTHER PUBLICATIONS

International Search Report in International Appln. No. PCT/JP2020/037019, dated Nov. 24, 2020, 5 pages (with English Translation).

*Primary Examiner* — Jimmy T Vu
(74) *Attorney, Agent, or Firm* — Fish & Richardson P.C.

(57) ABSTRACT

In an LED driving device, a DC-DC controller performs control such that the voltage at an LED terminal remains equal to a reference voltage, and a reference voltage generator generates the reference voltage such that it decreases as the set value of the LED current set by an LED current setter decreases.

13 Claims, 7 Drawing Sheets

(56) References Cited

U.S. PATENT DOCUMENTS

| | | | | |
|---|---|---|---|---|
| 2014/0232547 | A1 | 8/2014 | Kanemitsu et al. | |
| 2016/0128150 | A1* | 5/2016 | Ruan | H05B 45/46<br>315/186 |
| 2016/0302269 | A1 | 10/2016 | Kanemitsu et al. | |
| 2017/0249884 | A1 | 8/2017 | Kanemitsu et al. | |
| 2019/0208591 | A1* | 7/2019 | Chen | H05B 45/10 |

FOREIGN PATENT DOCUMENTS

| | | | | |
|---|---|---|---|---|
| JP | 2013-021117 | | 1/2013 | |
| JP | 2014-232604 | | 12/2014 | |
| JP | 2014232604 | A * | 12/2014 | H05B 33/0818 |

* cited by examiner

LED DRIVING DEVICE, LIGHTING DEVICE, AND VEHICLE-MOUNTED DISPLAY DEVICE

TECHNICAL FIELD

The present disclosure relates to LED driving devices.

BACKGROUND ART

Today, for their low power consumption and long lifetimes, LEDs (light-emitting devices) are used in a variety of applications. An example of a known LED driving device for driving an LED is disclosed in Patent Document 1 identified below.

The LED driving device of Patent Document 1 includes a DC-DC controller that controls an output stage for generating from an input voltage an output voltage and supplying it to LEDs, and a constant current driver that generates an output current to pass through the LEDs. This LED driving device drives LEDs in a plurality of channels.

The DC-DC controller includes an error amplifier that compares the lowest voltage among the cathode voltages of the LEDs in the plurality of channels with a reference voltage, and a PWM comparator that compares the output of the error amplifier and a slope signal to generate an internal PWM signal.

The constant current driver is turned on and off based on an external PWM signal that is fed in via a PWM terminal. This achieves PWM dimming control. During the period in which the constant current driver is on, by the error amplifier and the PWM comparator, a switching element in the output stage is PWM-driven with switching pulses such that the above-mentioned lowest voltage among the cathode voltages remains equal to the reference voltage. In this way, the output voltage (the anode voltage of the LEDs) is controlled to be at the voltage value which is the sum of the highest voltage among the forward voltages across the LEDs in the plurality of channels and the reference voltage.

CITATION LIST

Patent Literature

Patent Document 1: JP-A-2013-21117

SUMMARY

Technical Problem

With the LED driving device described above, the cathode voltage of the LED in the channel in which the forward voltage is highest is controlled to be at the reference voltage, and the cathode voltages of the LEDs in the other channels are controlled to be at a voltage higher than the reference voltage. The voltages at the respective cathodes of the LEDs in the plurality of channels and the currents that pass through those LEDs determine the power consumption, and hence heat generation, by the LED driving device.

Nowadays, for example, vehicle-mounted display devices have increasingly large display areas with increasing numbers of LEDs, and heat generation has become an issue of much concern.

Under the background mentioned above, an object of the present disclosure is to provide an LED driving device that can effectively suppress heat generation.

Solution to Problem

According to one aspect of the present disclosure, an LED driving device includes:

a DC-DC controller configured to control an output stage configured to generate from an input voltage an output voltage to supply the output voltage to the anode of an LED;

a constant current circuit configured to generate an LED current passing through the LED;

an LED terminal configured to be connected to a cathode of the LED;

a reference voltage generator configured to generate a reference voltage; and an LED current setter.

The DC-DC controller is configured to perform control such that the voltage at the LED terminal remains equal to the reference voltage, and the reference voltage generator is configured to generate the reference voltage such that, as the set value of the LED current set by the LED current setter decreases, the reference voltage decreases. (A first configuration.)

The first configuration described above may further include a ground terminal configured to be connected to a ground terminal.

The constant current circuit may include:

a first amplifier having one input terminal fed with a current setting reference voltage generated by the LED current setter;

a first transistor having a control terminal connected to the output terminal of the first amplifier, a first terminal connected to the LED terminal, and a second terminal connected to the other input terminal of the first amplifier at a first node; and a first resistor having one terminal connected to the first node, and another terminal control terminal the ground terminal. (A second configuration.)

In the first or second configuration described above, as the set value of the LED current varies, the reference voltage may vary linearly. (A third configuration.)

In the first to third configurations described above, when the set value of the LED current is equal to or lower than a predetermined threshold value, the reference voltage generator may keep the reference voltage constant. (A fourth configuration.)

Any of the first to fourth configurations described above may further include a current setting terminal configured to be connectable to an external resistor.

The LED current setter may include a current generator configured to generate a first current in accordance with the resistance value of the external resistor, and the LED current setter may be configured to generate the current setting reference voltage in accordance with the first current.

The reference voltage generator may include a second resistor through which a second current passes in accordance with the first current.

The reference voltage may appear at one terminal of the second resistor. (A fifth configuration.)

In the fifth configuration described above, the reference voltage generator may further include a second amplifier having one input terminal fed with a predetermined lower limit voltage, another input terminal connected to one terminal of the second resistor; and an output terminal connected to the one terminal of the second resistor. (A sixth configuration.)

In the fifth or sixth configuration described above, the LED current setter may include:

a first current mirror configured to generate a third current based on the first current;

a third resistor through which the third current passes; and a second current mirror configured to generate the second current based on the first current.

The current setting reference voltage may appear at one terminal of the third resistor. (A seventh configuration.)

In any of the fifth to seventh configurations described above, the current generator may include:

a third amplifier configured to have one input terminal fed with a dimming instruction signal that is variable;

a second transistor having a control terminal connected to the output terminal of the third amplifier, and a first terminal connected to the other input terminal of the third amplifier and to the current setting terminal. (An eighth configuration.)

The eighth configuration described above may further include a dimming controller configured, when a set LED current ratio is equal to or higher than an LED current ratio threshold value, to perform DC dimming while keeping the constant current circuit constantly on and, when the set LED current ratio is lower than the LED current ratio threshold value, to perform PWM dimming by turning on and off the constant current circuit. (A ninth configuration.)

In the ninth configuration described above, the LED current ratio threshold value may be variably set. (A tenth configuration.)

The tenth configuration described above may further include: an interval voltage generator configured to generate an internal voltage based on the input voltage; and a dimming terminal configured to be able to be fed with a voltage resulting from dividing the internal voltage with voltage division resistors.

The LED current ratio threshold value may be variably set in accordance with the voltage fed to the dimming terminal. (An eleventh configuration.)

In any of the first to eleventh configurations described above, the output voltage may be supplied to the respective anodes of LEDs, each like the LED mentioned above, in a plurality of channels.

The LED driving device may further include:

a plurality of LED terminals, each like the LED terminal mentioned above, connected to the respective anodes of the LEDs in the plurality of channels; and a selector configured to select the lowest voltage among the voltages at the plurality of LED terminals.

The DC-DC controller may be configured to perform control such that the lowest voltage remains equal to the reference voltage. (A twelfth configuration.)

According to another aspect of the present disclosure, a lighting device includes: the LED driving device of any of the configurations described above; the output stage; and the LED.

According to another aspect of the present disclosure, a vehicle-mounted display device includes the lighting device of the configuration described above.

DESCRIPTION OF EMBODIMENTS

Hereinafter, an embodiment of the present disclosure will be described with reference to the accompanying drawings. Any signal values, temperature values, and the like specifically mentioned in the following description are merely illustrative.

1. Configuration of an LED Driving Device

Figure 1:
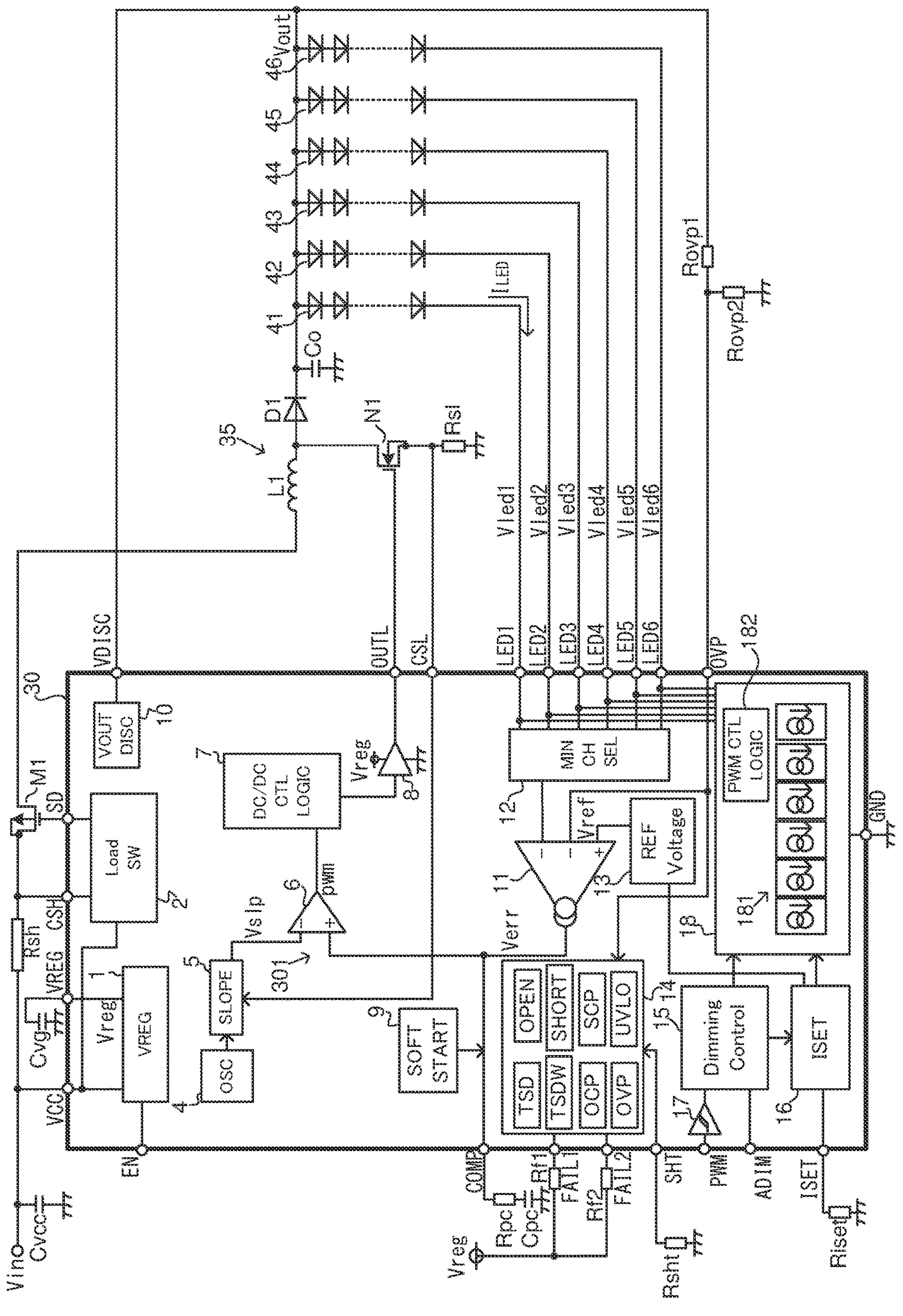
FIG. 1 is a configuration diagram showing the configuration of an LED driving device according to one embodiment of the present disclosure.

FIG. 1 is a circuit configuration diagram showing the configuration of an LED driving device 30 according to one embodiment of the present disclosure. The LED driving device 30 shown in FIG. 1 drives LED arrays 41 to 46 in a plurality of channels (here, as an example, six channels). The LED driving device 30 is a semiconductor device that has integrated in it an internal voltage generator 1, a current detector 2, an oscillator 4, a slope generator 5, a PWM comparator 6, a control logic circuit 7, a driver 8, a soft starter 9, an output discharger 10, an error amplifier 11, a selector 12, a reference voltage generator 13, a protection circuit 14, a dimming controller 15, an LED current setter 16, a Schmitt trigger 17, and a constant current driver 18.

The LED driving device 30 also has, as external terminals for establishing electrical connection with the outside, a VCC terminal, a VREG terminal, a CSH terminal, an SD terminal, a VDISC terminal, an OUTL terminal, a CSL terminal, LED1 to LED6 terminals, an OVP terminal, a GND terminal, an ISET terminal, an ADIM terminal, a PWM terminal, an SHT terminal, a FAIL2 terminal, a FAIL1 terminal, a COMP terminal, and an EN terminal.

Outside the LED driving device 30, an output stage 35 is arranged that generates from an input voltage Vin an output voltage Vout by DC-DC conversion and feeds the output voltage Vout to the anodes of the LED arrays 41 to 46. The output stage 35 includes a switching element N1, a diode D1, an inductor L1, and an output capacitor Co. The switching element N1 is driven and controlled by the LED driving device 30, and thereby the output stage 35 is controlled by the LED driving device 30. The output stage 35 and the LED driving device 30 together constitute a DC-DC converter. In this embodiment, the DC-DC converter so constituted is, more specifically, a boost (step-up) DC-DC converter.

An application terminal for the input voltage Vin is connected to one terminal of a capacitor Cvcc, to the VCC terminal, and to one terminal of a resistor Rsh. The other terminal of the capacitor Cvcc is connected to a ground terminal. The other terminal of the resistor Rsh is connected to the CSH terminal and to the source of a transistor M1, which is configured as a p-channel MOSFET. The drain of the transistor M1 is connected to one terminal of the inductor L1. The gate of the transistor M1 is connected to the SD terminal. The other terminal of the inductor L1 is connected to the anode of the diode D1 and to the drain of the switching element N1, which is configured as an n-channel MOSFET. The source of the switching element N1 is connected via a resistor Rsl to the ground terminal. The gate of the switching element N1 is connected to the OUTL terminal. The cathode of the diode D1 is connected to one terminal of the output capacitor Co. The other terminal of the output capacitor Co is connected to the ground terminal. At one terminal of the output capacitor Co, the output voltage Vout appears.

The switching element N1 may be included in the LED driving device.

To the one terminal of the output capacitor Co at which the output voltage Vout appears, the respective anodes of the LED arrays 41 to 46 are connected. The LED arrays 41 to 46 are each composed of a plurality of LEDs connected in series. The respective cathodes of the LED arrays 41 to 46 are connected to the LED1 to LED6 terminals respectively.

The LED arrays 41 to 46 may each be composed of, for example, LEDs connected in parallel instead of in series, or may each be composed of a single LED. The number of LED arrays that can be driven is not limited to six, and may instead be four or any other number, and may be one, that is, only one LED array in a single channel.

Next, the internal configuration of the LED driving device 30 will be described.

When the EN terminal is at high level, the internal voltage generator 1 generates from the input voltage Vin fed in via the VCC terminal an internal voltage Vreg (e.g., 5 V) and feeds it out via the VREG terminal. The internal voltage Vreg is used as a supply voltage for the internal circuits included in the LED driving device 30. To the VREG terminal, a capacitor Cvg is connected.

To the current detector 2, the CSH terminal and the SD terminal are connected.

The oscillator 4 generates a predetermined clock signal and feeds it to the slope generator 5.

Based on the clock signal fed from the oscillator 4, the slope generator 5 generates a slope signal (triangular-wave signal) Vslp and feeds it to the PWM comparator 6. The slope generator 5 also has the function of giving the slope signal Vslp an offset in accordance with the voltage at the CSL terminal, which voltage results from converting the current through the switching element N1 with the resistor Rsl.

The PWM comparator 6 compares an error signal Verr, which is fed to its non-inverting input terminal (+), with the slope signal Vslp, which is fed to its inverting input terminal (−), to generate an internal PWM signal pwm, and feeds it to the control logic circuit 7.

Based on the internal PWM signal pwm, the control logic circuit 7 generates a driving signal for the driver 8.

Based on the driving signal fed from the control logic circuit 7, the driver 8 generates for the switching element N1 a gate voltage, which is a pulse voltage that alternates between the internal voltage Vreg and the ground voltage.

Based on the gate voltage fed from the driver 8, the switching element N1 is turned on and off.

To the LED1 to LED6 terminals respectively, LED terminal voltages Vled1 to Vled6 are applied as the respective cathode voltages of the LED arrays 41 to 46. The selector 12 selects, out of the LED terminal voltages Vled1 to Vled6, the lowest voltage and feeds it to one inverting input terminal (−) of the error amplifier 11. The other inverting input terminal (−) of the error amplifier 11 is fed with the voltage at the OVP terminal, which voltage results from dividing the output voltage Vout with voltage division resistors Rovp1 and Rovp2. The non-inverting input terminal (+) of the error amplifier 11 is fed with a reference voltage Vref. The error amplifier 11 amplifies the difference between, of the voltages fed to its two inverting input terminals (−), the lower voltage and the reference voltage Vref to generate the error signal Verr, and feeds it to the PWM comparator 6. At start-up, feedback control is performed based on the OVP terminal for quick start-up; after start-up, feedback control is performed based on the output of the selector 12.

The output terminal of the error amplifier 11 is connected to the COMP terminal. The COMP terminal is connected to the ground terminal via a resistor Rpc and a capacitor Cpc that are connected in series outside.

The soft starter 9 performs control such that the voltage level of the error signal Verr rises gently. This helps suppress an overshoot in the output voltage Vout and a inrush current.

The protection circuit 14 includes a TSD circuit, a TSDW (thermal warning) circuit, an OCP circuit, an OVP circuit, an LED open detection circuit (OPEN), an LED short detection circuit (SHORT), an output short protection circuit (SCP), and a UVLO circuit.

The TSD circuit shuts down the circuits other than the internal voltage generator 1 when the junction temperature in the LED driving device 30 becomes, for example, equal to or higher than 175° C. Incidentally, the TSD circuit restores circuit operation when the junction temperature in the LED driving device 30 falls to, for example, 150° C.

The OCP circuit monitors the voltage at the CSL terminal, which voltage (input current sense voltage) results from sensing the current through the switching element N1 as a voltage signal across the resistor Rsl, and applies overcurrent protection when the voltage at the CSL terminal becomes, for example, equal to or higher than 0.3 V. When applying overcurrent protection, the OCP circuit suspends DC-DC switching.

To the SD terminal, the gate of the transistor M1 is connected. When the current detector 2 detects an overcurrent through the resistor Rsh (an overcurrent through the inductor L1), it turns off the transistor M1 and cuts off the path from the application terminal for the input voltage Vin to the inductor L1.

The OVP circuit monitors the voltage at the OVP terminal, and applies overvoltage protection when the voltage at the OVP terminal becomes, for example, equal to or higher than 1.0 V. When overvoltage protection is applied, DC-DC switching is suspended.

The LED open detection circuit (OPEN) operates such that, when any of the LED terminal voltages Vled1 to Vled6 is, for example, equal to or lower than 0.3 V and in addition the voltage at the OVP terminal is, for example, equal to or higher than 1.0 V, an LED open fault is detected, and whichever of the LED arrays is detected to have an LED open fault is latched off.

The LED short detection circuit (SHORT) operates such that, when any of the LED terminal voltages Vled1 to Vled6 is, for example, equal to or higher than 4.5 V, an incorporated counter starts counting so that, about 13 ms thereafter a latch is effected and whichever of the LED arrays is detected to have an LED short fault is latched off. To the SHT terminal, a resistor Rsht for setting LED short protection is connected.

The output short protection circuit (SCP) operates such that, when the voltage at the OVP terminal becomes, for example, equal to or lower than 0.25V, or when any of the LED terminal voltages Vled1 to Vled6 becomes, for example, equal to or lower than 0.3 V, an incorporated counter starts counting so that, about 13 ms thereafter a latch is effected and the circuits other than the internal voltage generator 1 are shut down. The output short protection circuit can cope with both short-circuiting at the anode side (DC-DC output terminal side) of the LED arrays 41 to 46 and short-circuiting at the cathode side of the LED arrays 41 to 46.

The UVLO circuit shuts down the circuits other than the internal voltage generator 1 when the input voltage Vin becomes, for example, equal to or lower than 2.8 V, or when the internal voltage Vreg becomes, for example, equal to or lower than 2.7 V.

The protection circuit 14 feeds out via the FAIL1 terminal a fault detection signal based on the status of fault detection by the TSDW circuit. To the FAIL1 terminal, the VREG terminal is connected via a resistor Rf1. When the TSDW circuit detects a fault, the protection circuit 14 turns on a transistor (not illustrated) connected to the FAIL1 terminal to output low level via the FAIL1 terminal.

The protection circuit 14 feeds out via the FAIL2 terminal a fault detection signal based on the status of fault detection by the LED open detection circuit, the LED short detection circuit, and the output short protection circuit. To the FAIL2 terminal, the VREG terminal is connected via a resistor Rf2. When any of the TSD circuit, the OCP circuit, the LED open detection circuit, the LED short detection circuit, and the output short protection circuit (SCP) detects a fault, the protection circuit 14 turns on a transistor (not illustrated) connected to the FAIL2 terminal to output low level via the FAIL2 terminal.

The Schmitt trigger 17 transmits to the dimming controller 15 a PWM dimming signal fed in via the PWM terminal from the outside. The PWM dimming signal is fed in as a pulse signal. The dimming controller 15 is fed with an analog dimming signal from the outside via the ADIM terminal (dimming terminal). As will be described later, the dimming controller 15 switches between DC dimming and PWM dimming based on the PWM dimming signal and the analog dimming signal fed to it. The dimming controller 15 feeds the constant current driver 18 with a PWM dimming instruction. The dimming controller 15 also feeds the LED current setter 16 with a DC dimming instruction.

The LED current setter 16 sets in the constant current driver 18 a constant current value in accordance with the resistance value of a resistor Riset (external resistor) connected to the ISET terminal (current setting terminal) and the DC dimming instruction from the dimming controller 15. The reference voltage generator 13 generates the reference voltage Vref in accordance with the constant current value set by the LED current setter 16. The configurations of the LED current setter 16 and the reference voltage generator 13 will be described in detail later.

The constant current driver 18 includes constant current circuits 181, corresponding to six channels, arranged between the LED1 to LED6 terminals respectively and the GND terminal, which is connected to the ground terminal. The constant current driver 18 further includes a PWM control logic circuit 182. The PWM control logic circuit 182 turns on and off the constant current circuits 181 in accordance with the on duty factor of PWM dimming demanded from the dimming controller 15. Specifically, the PWM control logic circuit 182 keeps the constant current circuits 181 on during an LED current on period that reflects the on duty factor of PWM dimming, and keeps the constant current circuits 181 off during an LED current off period that reflects the on duty factor of PWM dimming. When the constant current circuits 181 are on, an LED current $I_{LED}$ with the constant current value set by the LED current setter 16 passes.

The VDISC terminal is connected to the output discharger 10. The VDISC terminal is connected to the one terminal the output capacitor Co at which the output voltage Vout appears. Starting up with electric charge left in the output capacitor Co may cause flickering of LEDs. To prevent that, the output capacitor Co needs to be discharged at start-up, but it may take time to discharge electric charge solely across the OVP setting resistors Rovp1 and Rovp2 and the like; as a remedy, the output discharger 10 discharges the electric charge left in the output capacitor Co. This discharging is performed with the DC-DC converter off (when the signal at the EN terminal is low, and during protection).

2. DC-DC Controller

The LED driving device 30 incorporates a DC-DC controller 301 (i.e., the circuit block including the oscillator 4, the slope generator 5, the PWM comparator 6, the control logic circuit 7, the driver 8, and the error amplifier 11), and this will now be described in detail.

The error amplifier 11 amplifies the difference between, of the lowest value among the LED terminal voltages Vled1 to Vled6 as selected by the selector 12 and the voltage at the OVP terminal, the lower voltage and the reference voltage Vref to generate the error voltage Verr. The voltage value of the error voltage Verr is higher as the just-mentioned lower voltage is further lower than the reference voltage Vref.

The PWM comparator 6 compares the error voltage Verr with the slope signal Vslp to generate the internal PWM signal pwm. The internal PWM signal pwm is at high level when the error voltage Verr is higher than the slope signal Vslp, and is at low level when the error voltage Verr is lower than the slope signal Vslp.

The control logic circuit 7 turns on and off the switching element N1 based on the internal PWM signal pwm. Specifically, the control logic circuit 7 keeps the switching element N1 on when the internal PWM signal pwm is at high level. Conversely, the control logic circuit 7 keeps the switching element N1 off when the internal PWM signal pwm is at low level.

Thus a feedback controller constituted by the error amplifier 11, the PWM comparator 6, the control logic circuit 7, and the driver 8 performs feedback control by feeding out switching pulses via the OUTL terminal to the switching element N1 such that the lowest value among the LED terminal voltages Vled1 to Vled6 remains equal to the reference voltage Vref That is, the DC-DC controller 301 includes the feedback controller just described.

With the switching element N1 on, a current passes across the path from the application terminal for the input voltage Vin via the resistor Rsh, the transistor M1, the inductor L1, and the switching element N1 to the ground terminal, and energy is stored in the inductor L1. Meanwhile, the diode D1 is reverse-biased, and thus no current passes from the output capacitor Co to the switching element N1. If electric charge is left in the output capacitor Co, an LED current $I_{LED}$ passes from the output capacitor Co to the anodes of the LED arrays 41 to 46.

With the switching element N1 off, the energy stored in the inductor L1 is released; thus a current, as the LED current $I_{LED}$, passes into the LED arrays 41 to 46 and also into the output capacitor Co, charging the output capacitor Co.

As the operation described above is repeated, the anodes of the LED arrays 41 to 46 are fed with the output voltage Vout obtained by boosting the input voltage Vin.

2. PWM Dimming and DC Dimming

The LED driving device 30 according to the embodiment has the function of switching between PWM dimming and DC dimming according to a setting made, and this will be described below. DC dimming denotes dimming achieved by keeping the LED current $I_{LED}$ constantly on with the constant current driver 18 while changing the constant current value of the LED current $I_{LED}$.

Figure 2:
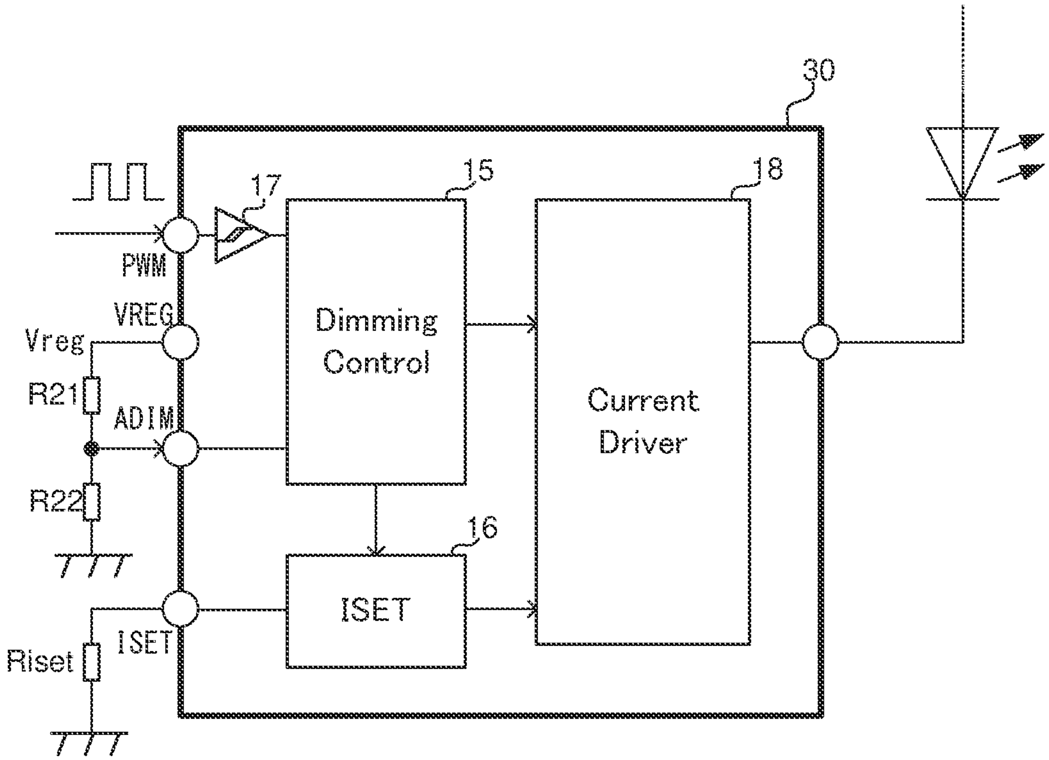
FIG. 2 is a diagram showing, in a simplified form, part of the configuration involved in a dimming function in an LED driving device according to one embodiment of the present disclosure.

FIG. 2 is a diagram showing the configuration involved in the function of switching between PWM dimming and DC dimming, and shows, in a simplified form, part of the LED driving device 30 shown in FIG. 1 referred to previously.

The PWM dimming signal fed in via the PWM terminal is fed via Schmitt trigger 17 to the dimming controller 15. Between the VREG terminal and the ground terminal, resistors R21 and R22 are connected in series, and to the connection node between the resistors R21 and R22, the ADIM terminal is connected. In accordance with the combination of the resistance values of the resistors R21 and R22, the voltage division ratio in which the internal voltage Vreg appearing at the VREG terminal is divided varies, and the analog dimming signal (voltage signal) applied to the ADIM terminal varies.

In accordance with the analog dimming signal applied to the ADIM terminal, an LED current ratio threshold value across which to switch between PWM dimming and DC dimming is set. Thus, in accordance with the combination of the resistance values of the resistors R21 and R22, the LED current ratio threshold value can be set. An LED current ratio is given as a ratio in percentage relative to, as 100%, a predetermined LED current value set by the LED current setter 16 in accordance with the resistor Riset connected to the ISET terminal and the instruction from the dimming controller 15. For example, in accordance with the combination of the resistance values of the resistors R21 and R22, the LED current ratio threshold value can be set at 100%, 50%, 25%, or 12.5%.

On the other hand, a set LED current ratio is set in accordance with the duty factor of the PWM dimming signal. The dimming controller 15 compares the set LED current ratio with the LED current ratio threshold value that is set. If the set LED current ratio is equal to or higher than the LED current ratio threshold value, the dimming controller 15 instructs the LED current setter 16 to set the LED current value according to the set LED current ratio, and instructs the constant current driver 18 to perform DC dimming while keeping the LED current constantly on.

By contrast, if the set LED current ratio is lower than the LED current ratio threshold value, the dimming controller 15 instructs the LED current setter 16 to set the LED current value according to the LED current ratio threshold value, and instructs the constant current driver 18 to perform PWM dimming with an on duty factor corresponding to the set LED current ratio.

Figure 3:
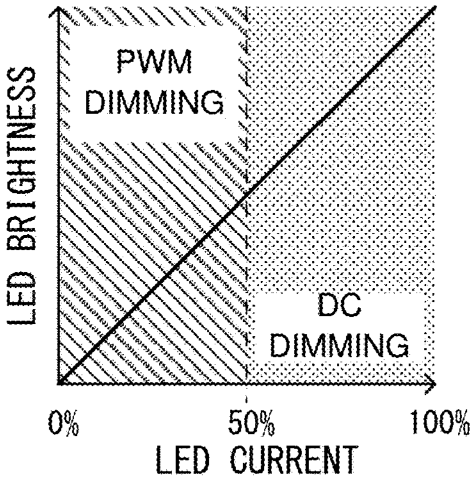
FIG. 3 is a chart showing dimming switching with an LED current ratio threshold value of 50%.

Specific examples of switching between PWM dimming and DC dimming will be described with reference to FIGS. 3 to 5. FIG. 3 shows a case where the LED current ratio threshold value is set at 50%. In this case, when the set LED current ratio is equal to or higher than 50%, DC dimming is performed, and when LED current ratio is lower than 50%, PWM dimming is performed. In this case, if the set LED current ratio is, for example, 80%, DC dimming is performed with the LED current value at 80%; if the set LED current ratio is, for example, 40%, PWM dimming is performed with the LED current value at 50% and with the on duty factor at 80%.

In the case shown in FIG. 3, assuming that PWM dimming can achieve a high dimming factor of, for example, 10000, then its combination with the dimming factor of DC dimming, namely 2, achieves a high dimming factor of 20000.

Figure 4:
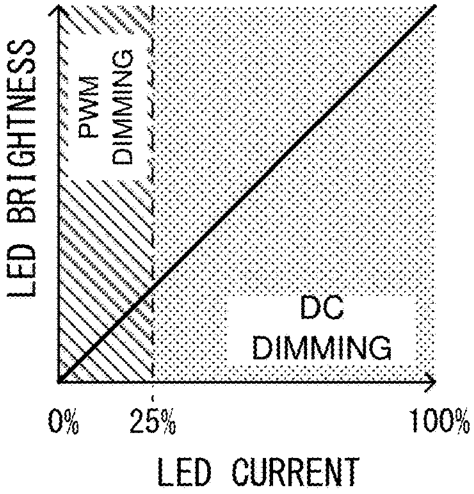
FIG. 4 is a chart showing dimming switching with an LED current ratio threshold value of 25%.
Figure 5:
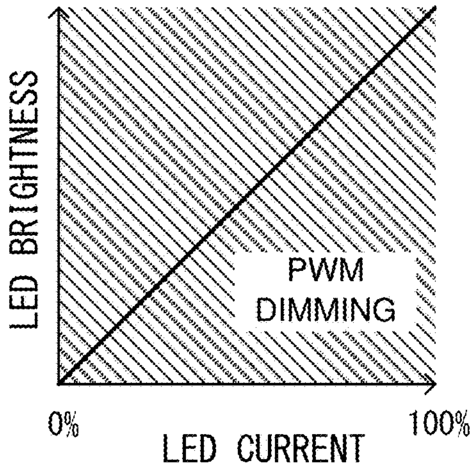
FIG. 5 is a chart showing dimming switching with an LED current ratio threshold value of 100%.

Likewise, FIG. 4 shows a case where the LED current ratio threshold value is set at 25%. In this case, if the set LED current ratio is, for example, 40%, unlike in the case shown in FIG. 3, DC dimming is performed. FIG. 5 shows a case where the LED current ratio threshold value is set at 100%. In this case, with any set LED current ratio, PWM dimming is performed.

Incidentally, when PWM dimming is performed, the on duty factor may be adjusted with the LED current value kept at 100%. For example, in a case where the LED current ratio threshold value is 50% and the set LED current ratio is 40%, PWM dimming can be performed with the LED current value at 100% and the on duty factor at 40%.

Figure 6:
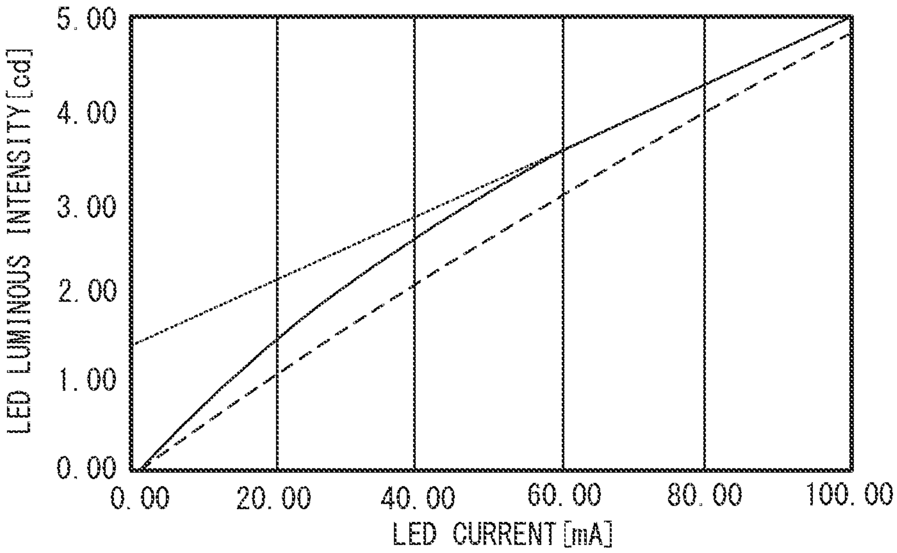
FIG. 6 is a chart showing one example of the relationship of LED current with LED luminous intensity.

Here, FIG. 6 is a chart showing one example of the relationship of LED current with LED luminous intensity. In FIG. 6, the solid line depicts DC dimming and the broken line depicts PWM dimming. As shown there, DC dimming tends to exhibit a great drop in LED luminous intensity in a region of low LED current. By contrast, PWM dimming maintains linearity of LED luminous intensity even in a region of low LED current and tends to exhibit a small drop in LED luminous intensity. Accordingly, by performing DC dimming in a region of high LED current and PWM dimming in a region of low LED current as mentioned above, it is possible to suppress variation in LED luminous intensity.

The region of LED current in which a great drop in LED luminous intensity is observed varies with the characteristics of the LEDs used. Thus, the LED current ratio threshold value is left variably settable.

Figure 7:
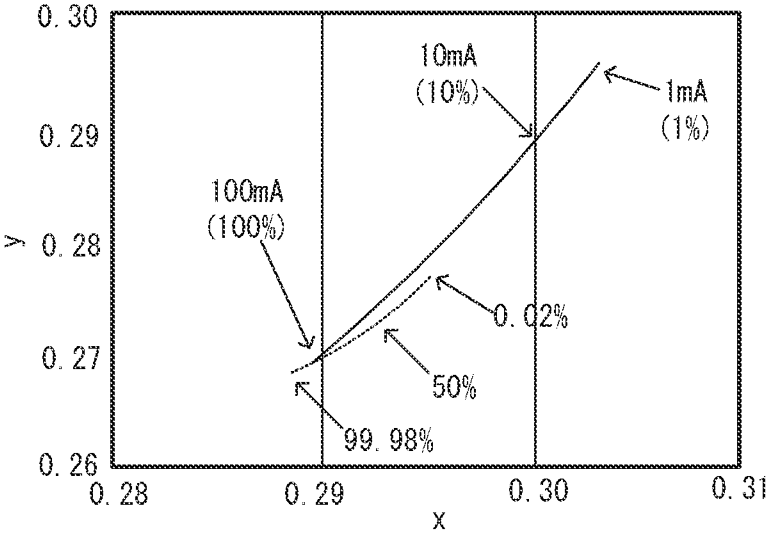
FIG. 7 is a chart showing one example of the relationship of LED current with chromaticity.

FIG. 7 is a chart showing one example of the relationship of LED current with chromaticity. In FIG. 7, the solid line depicts DC dimming and the broken line depicts PWM dimming. As shown in FIG. 7, DC dimming, despite providing a lower dimming factor (from 100% to 1%) than PWM dimming (99.98% to 0.02%), provides greater variation in chromaticity. Accordingly, by switching between DC dimming and PWM dimming as mentioned above, it is possible to suppress variation in chromaticity while achieving a high dimming factor.

3. Variable Control of LED Terminal Control Voltage

As described with reference to FIG. 1 referred to earlier, in the LED driving device 30 according to the embodiment, control is performed such that, of the voltages applied to the LED1 to LED6 terminals to which the respective cathodes of the LED arrays 41 to 46 in the plurality of channels are connected, the lowest voltage selected by the selector 12 remains equal to the reference voltage Vref. The LED driving device 30 has the function of variably controlling the reference voltage Vref mentioned above, which is an LED terminal control voltage. This will now be described.

Figure 8:
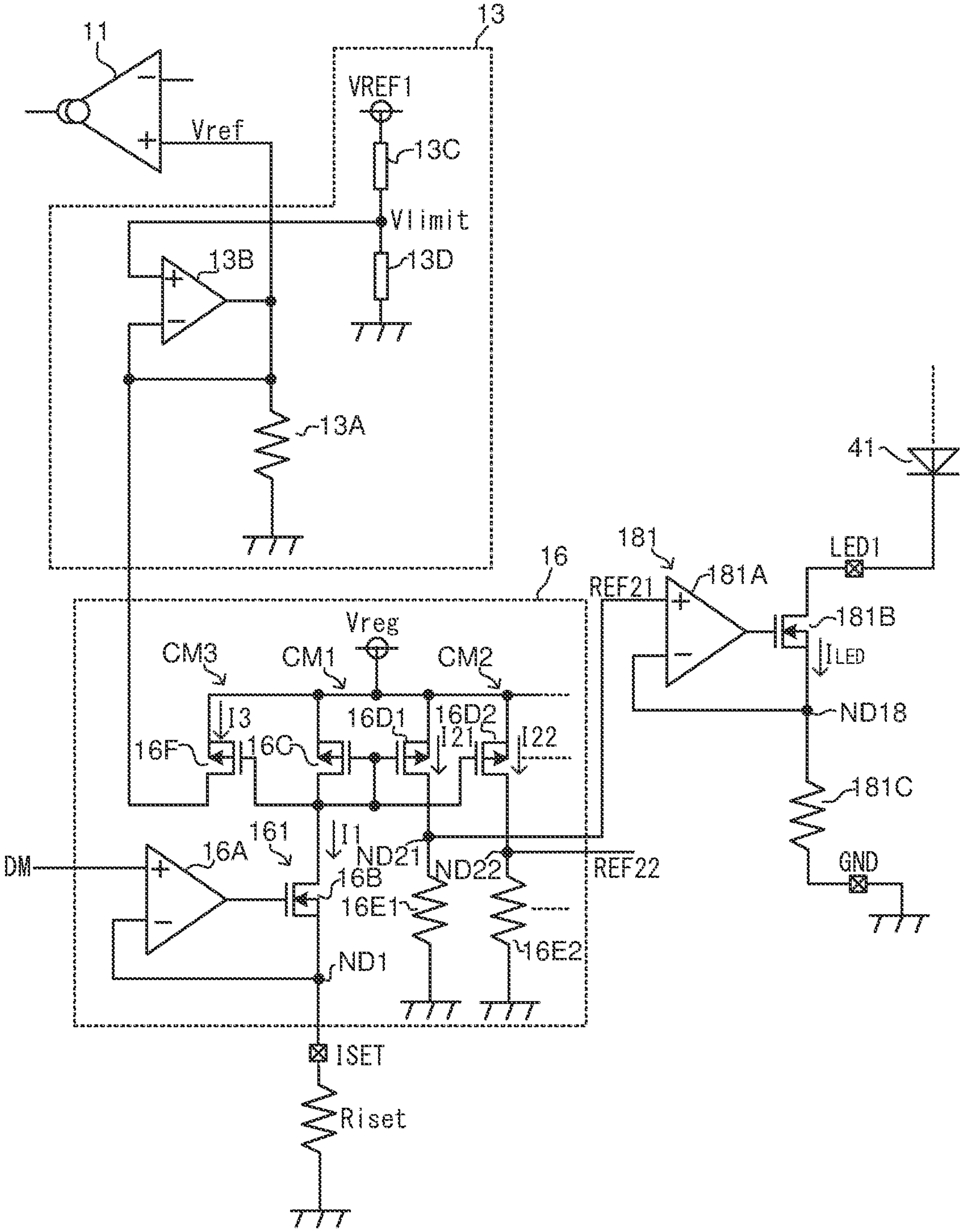
FIG. 8 is a diagram showing a circuit configuration of an LED current setter, a constant current circuit, and a reference voltage generator according to one embodiment of the present disclosure.

FIG. 8 is a diagram showing one configuration example of the reference voltage generator 13, the LED current setter 16, and the constant current circuit 181.

The LED current setter 16 includes an amplifier 16A, a transistor 16B, transistors 16C, 16D1, 16D2, and 16F each configured as a p-channel MOSFET, and resistors 16E1 and 16E2. The amplifier 16A and the transistor 16B together constitute a current generator 161 that generates a current I1 (first current) corresponding to the resistance value of the resistor Riset.

The non-inverting input terminal (+) of the amplifier 16A is fed with a dimming instruction signal DM from the dimming controller 15 (FIG. 2). The dimming instruction signal DM is a variable analog signal. The output terminal of the amplifier 16A is connected to the gate of the transistor 16B, which is an n-channel MOSFET. The source of the transistor 16B is connected to the ISET terminal at a node ND1. The node ND1 is connected to the inverting input terminal (−) of the amplifier 16A.

The drain of the transistor 16C is connected to the drain of the transistor 16B. The gate and drain of the transistor 16C are short-circuited together. The gate of the transistor 16C is connected to the gate of the transistor 16D1. The respective sources of the transistor 16C and 16D1 are fed with, as a supply voltage, the internal voltage Vreg. The drain of the transistor 16D1 is connected to one terminal of the resistor 16E1 at a node ND21. The other terminal of the resistor 16E1 is connected to the ground terminal. The transistor 16C and the transistor 16D1 constitute a current mirror CM1.

The amplifier 16A controls the gate of the transistor 16B such that the voltage at the node ND1 remains equal to the voltage of the dimming instruction signal DM. Thus, with the dimming instruction signal DM and the resistor Riset connected to the ISET terminal, the current I1 through the transistor 16B is generated. Based on the current I1, the current mirror CM1 generates a current I21 (third current) through the resistor 16E1. With the resistor 16E1 and the current I21, a current setting reference voltage REF21 is generated at the node ND21.

As shown in FIG. 8, the constant current circuit 181 includes an amplifier 181A, a transistor 181B, and a resistor 181C. It should be noted that FIG. 8 shows, as a representative, the constant current circuits 181 corresponding to the LED array 41 (LED1 terminal), and the constant current circuits 181 corresponding to the LED arrays 42 to 46 are configured similarly to the one shown in FIG. 8.

The non-inverting input terminal (+) of the amplifier 181A is fed with the current setting reference voltage REF21 output from the LED current setter 16. The output terminal of the amplifier 181A is connected to the gate of the transistor 181B, which is an n-channel MOSFET. The source of the transistor 181B is connected to one terminal of the resistor 181C at a node ND18. The node ND18 is connected to the inverting input terminal (−) of the amplifier 181A. The other terminal of the resistor 181C is connected via the GND terminal to the ground terminal. The drain of the transistor 181B is connected to the LED1 terminal.

The amplifier 181A controls the gate of the transistor 181B such that the voltage at the node ND18 remains equal to the current setting reference voltage REF21. Thus, with the current setting reference voltage REF21 and the resistor 181C, the LED current $I_{LED}$ (constant current) through the transistor 181B is generated.

Thus, with the same dimming instruction signal DM, the higher the resistance value of the resistor Riset, the lower the current values of the currents I1 and I21, the lower the current setting reference voltage REF21, and the lower the constant current value of the LED current $I_{LED}$.

As shown in FIG. 8, the transistor 16C and the transistor 16D2 together constitute a current mirror CM2, and with the current I22 that passes through the transistor 16D2 and the resistor 16E2, a current setting reference voltage REF22 to be fed to the constant current circuit 181 for the LED array 42 is generated at a node ND22. Also for each of the constant current circuits 181 for the LED arrays 43 to 46, a similar circuit for generating a current setting reference voltage is formed.

Owing to the control for keeping the lowest voltage among the voltages applied to the LED1 to LED6 terminals equal to the reference voltage Vref, if there is a variation among the forward voltages across the LED arrays 41 to 46, the voltages applied to the LED terminals other than the LED terminal to which the lowest voltage is applied are higher than the reference voltage Vref. As a result, the drain-source voltages Vds of the transistors 181B connected to the LED terminals other than the LED terminal to which the lowest voltage is applied is higher than the drain-source voltage Vds of the transistor 181B connected to the LED terminal to which the lowest voltage is applied. Accordingly, for the LED terminals other than the LED terminal to which the lowest voltage is applied, the on-resistance values of the transistors 181B for letting the same LED current $I_{LED}$ pass through them is higher, making the gate voltages of those transistors 181B lower; thus the LED current $I_{LED}$ can be passed through them without any problem.

As shown in FIG. 8, the reference voltage generator 13 includes a resistor 13A, an amplifier 13B, and resistors 13C and 13D. Here, the LED current setter 16 includes a current mirror CM3 constituted by the transistor 16C and the transistor 16F. Specifically, the gate of the transistor 16F is connected to the gate of the transistor 16C. The source of the transistor 16F is fed with the internal voltage Vreg. The drain of the transistor 16F is connected to one terminal of the resistor 13A.

The other terminal of the amplifier 13B is connected to the ground terminal. One terminal of the resistor 13A is connected to the non-inverting input terminal (+) of the error amplifier 11 (FIG. 1). The non-inverting input terminal (+) of the amplifier 13B is fed with a lower limit voltage Vlimit resulting from dividing a predetermined supply voltage VREF1 with the resistors 13C and 13D. The output terminal and the inverting input terminal (−) of the amplifier 13B are connected to one terminal of the resistor 13A.

Thus, based on the current I1 through the transistor 16C, the current mirror CM3 generates a current I3 (second current) through the transistor 16F. The current I3 passes through the resistor 13A, and thus, at one terminal of the resistor 13A, the reference voltage Vref corresponding to the current I3 is generated. For the same dimming instruction signal DM, the higher the resistance value of the resistor Riset, the smaller the currents I1 and I3, and the lower the reference voltage Vref.

When the reference voltage Vref becomes so low as to tend to fall below the lower limit voltage Vlimit, the reference voltage Vref is clamped at the lower limit voltage Vlimit by the amplifier 13B.

Figure 9:
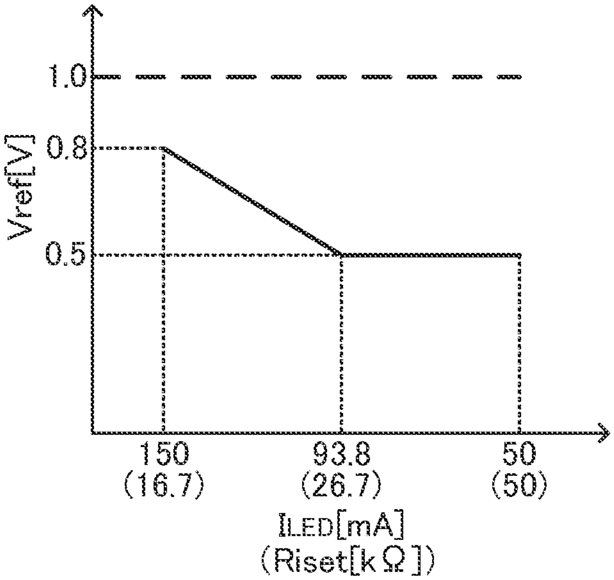
FIG. 9 is a chart showing one example of the relationship of a set value of LED current (resistance Riset) with reference voltage.

FIG. 9 is a chart showing one example of the relationship of the LED current $I_{LED}$ and the resistance Riset with the reference voltage Vref FIG. 9 shows, as an example, how the value of the LED current $I_{LED}$ varies as the resistance Riset is increased with the dimming instruction signal DM set at the maximum voltage corresponding to an LED current ratio of 100%.

As shown in FIG. 9, as the resistance Riset is increased from 16.7 kΩ to 26.7 kΩ, the LED current $I_{LED}$ decreases from 150 mA to 93.8 mA. Meanwhile, as indicated by the solid line in FIG. 9, the reference voltage generator 13 drops the reference voltage Vref from 0.8 V to 0.5 V. As the resistance Riset is further increased from the 26.7 kΩ to 50 kΩ, the LED current $I_{LED}$ decreases from 93.8 mA to 50 mA. Meanwhile, since the lower limit voltage Vlimit=0.5 V, the reference voltage Vref is clamped at 0.5 V to remain constant. That is, with the LED current $I_{LED}$ equal to or lower than a predetermined threshold value of 93.8 mA, the reference voltage Vref is kept constant.

In the example shown in FIG. 9, the design is as follows. For example, assuming that the resistance value of the resistor 181C is 1Ω, to pass an LED current $I_{LED}$ with a maximum value of 150 mA requires that the voltage generated at the node ND18 be 0.15 V; thus, assuming that the control voltage at the LED terminal (i.e., the reference voltage Vref)=0.8 V, the drain-source voltage Vds of the transistor 181B=0.8-0.15=0.65 V; then, based on the on-state resistance needed in the transistor 181B to pass an LED current $I_{LED}$=150 mA with that drain-source voltage Vds, the size of the transistor 181B is determined.

When the LED current $I_{LED}$ is reduced from the 150 mA, even if the control voltage at the LED terminal is reduced from 0.8 V, the needed on-stare resistance can be obtained with the size of the transistor 181B determined above. Reducing the control voltage at the LED terminal too far, however, results in too low a drain-source voltage Vds of the transistor 181B, leaving the transistor 181B in a state close to the fully-on state to keep a low on-state resistance, and this is undesirable. Accordingly, in the embodiment, the control voltage at the LED terminal is subject to the lower limit voltage Vlimit.

The power consumption by the LED driving device 30 is determined by the LED current $I_{LED}$ and the LED terminal voltage. In the embodiment, variable control is performed such that, as the set value of the LED current $I_{LED}$ decreases, the control voltage at the LED terminal, that is, the reference voltage Vref, decreases. Thus, as compared with a case where, for example, in the example shown in FIG. 9, the reference voltage Vref is kept constant at 0.8 V irrespective of the set value of the LED current $I_{LED}$, it is possible to suppress power consumption. In the example shown in FIG. 9, power consumption can be reduced, for example, by simply keeping the reference voltage Vref at 0.5 V irrespective of the set value of the LED current $I_{LED}$; in that case, however, passing the LED current $I_{LED}$ with a maximum value of 150 mA requires that the on-state resistance of the transistor 181B be reduced, and this inconveniently leads to an increased size of the transistor 181B. That is, with the embodiment, variable control of the reference voltage Vref makes it possible to reduce heat generation in the LED driving device 30 while suppressing the size of the transistor 181B.

While in the example shown in FIG. 9 variable control of the reference voltage Vref is performed linearly, it may instead be performed non-linearly (with a curved correlation). However, linear control can be achieved with a simpler configuration.

Figure 10:
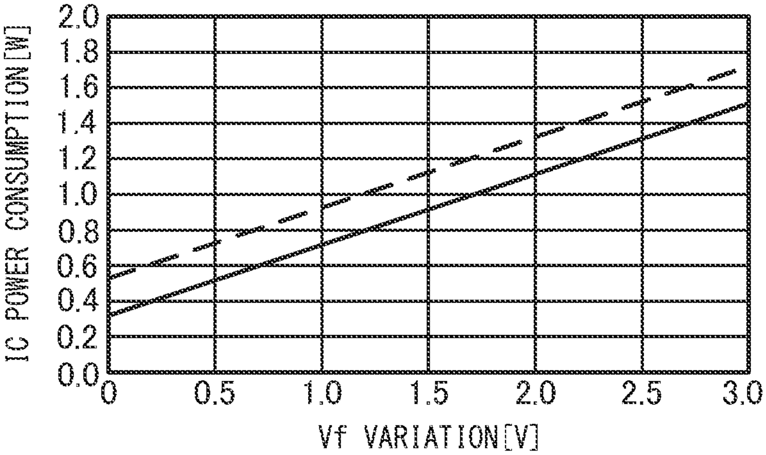
FIG. 10 is a chart showing one example of the relationship of variation in LED forward voltage and power consumption by an LED driving device.

FIG. 10 is a chart showing one example of the relationship of variation in forward voltage Vf among the LED arrays 41 to 46 with the power consumption by an LED driving device 30, as observed with the control characteristics in the example shown in FIG. 9, with the set value of the LED current $I_{LED}$=80 mA. In FIG. 10, the solid line depicts what is observed with the control characteristics indicated by the solid line (embodiment) in FIG. 9, and the broken line depicts what is observed with the control characteristics indicated by the broken line (comparative example) in FIG. 9. In the comparative example shown in FIG. 9, the reference voltage Vref is kept constant at 1.0 V irrespective of the LED current $I_{LED}$.

The power consumption of the LED driving device 30 (IC) is the sum of the circuit power, the gate driving power in the switching element N1, and the current driver power in the constant current circuit 181. The circuit power is given by Circuit Power=Circuit Current×VCC Voltage. The gate driving power is given by Gate Driving Power=Gate Capacitance×Vreg×Vreg×Oscillation Frequency. The current driver power is given by Current Driver Power=LED Terminal Voltage×LED Current+(LED Terminal Voltage+Vf Variation)×LED Current×(LED Channel Number−1).

For example, with the control characteristics shown in FIG. 9, if the set value of the LED current $I_{LED}$=80 mA, the reference voltage Vref=0.5 V; if the Vf variation is, for example, 1.0 V, the voltage at one LED terminal among the LED1 to LED6 terminals is 0.5 V and the voltages at the other five-channel LED terminals=0.5+1.0=1.5 V; on these assumptions, the above-mentioned current driver power is calculated.

As shown in FIG. 10, with the same Vf variation, the embodiment can reduce power consumption more than the comparative example. It is thus possible, with the embodiment, to increase the number of LEDs lit and the LED current value.

In the embodiment, when PWM dimming is performed, the dimming controller 15 sets the dimming instruction signal DM at the voltage value of the LED current ratio threshold value for the maximum voltage corresponding to an LED current ratio of 100%, and the constant current circuit 181 is turned on and off in accordance with the on duty factor of PWM dimming. By contrast, when DC dimming is performed, the constant current circuit 181 is kept constantly on, and the dimming controller 15 sets the dimming instruction signal DM at a voltage corresponding to the set LED current ratio. When PWM dimming is performed, the dimming instruction signal DM may instead be set at the maximum voltage corresponding to an LED current ratio of 100%. However, the function of switching between PWM dimming and DC dimming is not essential; for example, only a dimming function by PWM dimming may be provided.

4. Application to a Backlight Device

Figure 11:
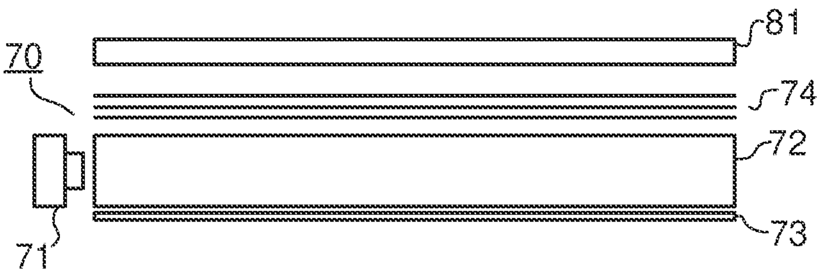
FIG. 11 is a diagram showing a configuration example of a backlight device.

As one example of the target of application of the LED driving device according to the embodiment of the present disclosure described above, a backlight device will be described. An example of the structure of a backlight device to which the LED driving device according to the embodiment of the present disclosure is applicable is shown in FIG. 11. While the structure shown in FIG. 11 is of what is called an edge-lit type, this is not meant as any limitation; a structure of a direct-lit type may instead be adopted.

The backlight device 70 shown in FIG. 11 is a lighting device that illuminates a liquid crystal panel 81 from behind.

The backlight device 70 includes an LED light source 71, a light guide plate 72, a reflector plate 73, and an optical sheet and the like 74. The LED light source 71 includes LEDs and a circuit board on which they are mounted. The light emitted from the LED light source 71 enters the light guide plate 72 through a side face of it. Formed of, for example, a plate of acrylic resin, the light guide plate 72 guides, by totally reflecting it, the light that has entered light guide plate 72 all over its interior, eventually letting the light emerge as planar light from the light guide plate 72 through its face at the side where the optical sheet and the like 74 are arranged. The reflector plate 73 reflects the light leaking out of the light guide plate 72 back into it. The optical sheet and the like 74 include a diffuser sheet, a lens sheet, and the like, and serves to uniformize and improve the brightness of the light that illuminates the liquid crystal panel 81. The LED light source 71 includes the LED driving device according to the embodiment of the present disclosure, an output stage, and LEDs. The LED driving device according to the embodiment of the present disclosure helps produce the liquid crystal panel 81 in larger sizes.

5. Vehicle-Mounted Display

A backlight device to which the LED driving device according to the embodiment of the present disclosure described above is applied is suitably used, in particular, as a vehicle-mounted display. The LED driving device described above helps widen the dimming rage of LEDs, and this is suitable to vehicle-mounted displays that are required to be capable of adjusting their brightness between driving during the day and driving in during the night, between ordinary driving during the day and driving in a tunnel, and the like.

Figure 12:
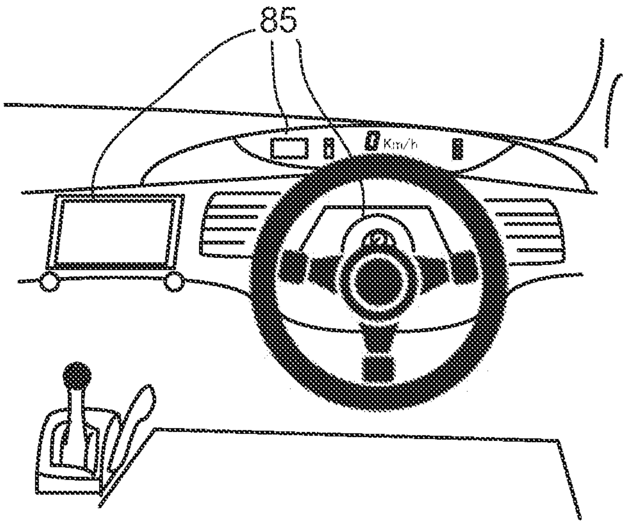
FIG. 12 is a diagram showing one example of a vehicle-mounted display.

A vehicle-mounted display, like the vehicle-mounted display 85 shown in FIG. 12, is provided, for example, on a dashboard in front of the driver's seat in a vehicle. The vehicle-mounted display 85 displays, for example, car navigation information, a shot image rearward of the vehicle, and various images such as images of a speedometer, a fuel level indicator, a fuel consumption indicator, and a shift position indicator, and can convey various kinds of information to the user. Such a vehicle-mounted display is called a cluster panel or a center information display (CID). The vehicle-mounted display may instead be one for rear entertainment that is arranged on a rear face of the driver's seat or the front passenger's seat.

6. Modifications

The embodiment described above should be considered to be in every aspect illustrative and not restrictive; it should be understood that the technical scope of the present disclosure is defined not by the description of the embodiment given above but by the appended claims and encompasses any modifications made in a sense and scope equivalent to the claims.

With an LED driving device according to the present disclosure, it is possible to effectively suppress heat generation.

INDUSTRIAL APPLICABILITY

The present disclosure finds applications in devices for driving vehicle-mounted LEDs.

REFERENCE SIGNS LIST

1 internal voltage generator
2 current detector
4 oscillator
5 slope generator
6 PWM comparator
7 control logic circuit
8 driver
9 soft starter
10 output discharger
11 error amplifier
12 selector
13 reference voltage generator
14 protection circuit
15 dimming controller
16 LED current setter
17 Schmitt trigger
18 constant current driver
181 constant current circuit
182 PWM control logic circuit
30 LED driving device
301 DC-DC controller
35 output stage
Co output capacitor
N1 switching element
D1 diode
L1 inductor
46 to 46 LED arrays
70 backlight device
71 LED light source
72 light guide plate
73 reflector plate
74 optical sheet and the like
81 liquid crystal panel
85 vehicle-mounted display

The invention claimed is:

1. An LED driving device comprising:

a DC-DC controller configured to control an output stage configured to generate from an input voltage an output voltage to supply the output voltage to an anode of an LED;

a constant current circuit configured to generate an LED current passing through the LED;

an LED terminal configured to be connected to a cathode of the LED;

a reference voltage generator configured to generate a reference voltage;

an LED current setter; and a current setting terminal configured to be connectable to an external resistor, wherein the DC-DC controller is configured to perform control such that a voltage at the LED terminal remains equal to the reference voltage, the reference voltage generator is configured to generate the reference voltage such that, as a set value of the LED current set by the LED current setter decreases, the reference voltage decreases, the LED current setter includes a current generator configured to generate a first current in accordance with a resistance value of the external resistor, the LED current setter being configured to generate the current setting reference voltage in accordance with the first current, the reference voltage generator includes a second resistor through which a second current passes in accordance with the first current, and the reference voltage appears at one terminal of the second resistor.

2. The LED driving device according to claim 1, further comprising a to-be-grounded terminal configured to be connected to a ground terminal, wherein the constant current circuit includes:

a first amplifier having one input terminal fed with a current setting reference voltage generated by the LED current setter;

a first transistor having a control terminal connected to an output terminal of the first amplifier, a first terminal connected to the LED terminal, and a second terminal connected to another input terminal of the first amplifier at a first node; and a first resistor having one terminal connected to the first node, and another terminal connected to the to-be-grounded terminal.

3. The LED driving device according to claim 1, wherein as the set value of the LED current varies, the reference voltage varies linearly.

4. The LED driving device according to claim 1, wherein when the set value of the LED current is equal to or lower than a predetermined threshold value, the reference voltage generator keeps the reference voltage constant.

5. The LED driving device according to claim 1, wherein the reference voltage generator further includes a second amplifier having:

one input terminal fed with a predetermined lower limit voltage;

another input terminal connected to one terminal of the second resistor; and an output terminal connected to the one terminal of the second resistor.

6. The LED driving device according to claim 1, wherein the LED current setter includes:

a first current mirror configured to generate a third current based on the first current;

a third resistor through which the third current passes; and a second current mirror configured to generate the second current based on the first current, wherein the current setting reference voltage appears at one terminal of the third resistor.

7. The LED driving device according to claim 1, wherein the current generator includes:

a third amplifier configured to have one input terminal fed with a dimming instruction signal that is variable;

a second transistor having:

a control terminal connected to an output terminal of the third amplifier, and a first terminal connected to another input terminal of the third amplifier and to the current setting terminal.

8. The LED driving device according to claim 7, further comprising a dimming controller configured, when a set LED current ratio is equal to or higher than an LED current ratio threshold value, to perform DC dimming while keeping the constant current circuit constantly on and, when the set LED current ratio is lower than the LED current ratio threshold value, to perform PWM dimming by turning on and off the constant current circuit.

9. The LED driving device according to claim 8, wherein the LED current ratio threshold value is variably set.

10. The LED driving device according to claim 9, further comprising:

an interval voltage generator configured to generate an internal voltage based on the input voltage; and a dimming terminal configured to be able to be fed with a voltage resulting from dividing the internal voltage with voltage division resistors, wherein the LED current ratio threshold value is variably set in accordance with a voltage fed to the dimming terminal.

11. A lighting device comprising:

the LED driving device according to claim 1;

the output stage; and the LED.

12. A vehicle-mounted display device comprising the lighting device according to claim 11.

13. An LED driving device comprising:

a DC-DC controller configured to control an output stage configured to generate from an input voltage an output voltage to supply the output voltage to an anode of an LED;

a constant current circuit configured to generate an LED current passing through the LED;

an LED terminal configured to be connected to a cathode of the LED;

a reference voltage generator configured to generate a reference voltage; and an LED current setter, wherein the DC-DC controller is configured to perform control such that a voltage at the LED terminal remains equal to the reference voltage, the reference voltage generator is configured to generate the reference voltage such that, as a set value of the LED current set by the LED current setter decreases, the reference voltage decreases, wherein the output voltage is supplied to respective anodes of the LEDs in a plurality of channels, the LED driving device further includes:

a plurality of the LED terminals connected to the respective anodes of the LEDs in the plurality of channels; and a selector configured to select a lowest voltage among voltages at the plurality of LED terminals, and the DC-DC controller is configured to perform control such that the lowest voltage remains equal to the reference voltage.

* * * * *